Figure 1:
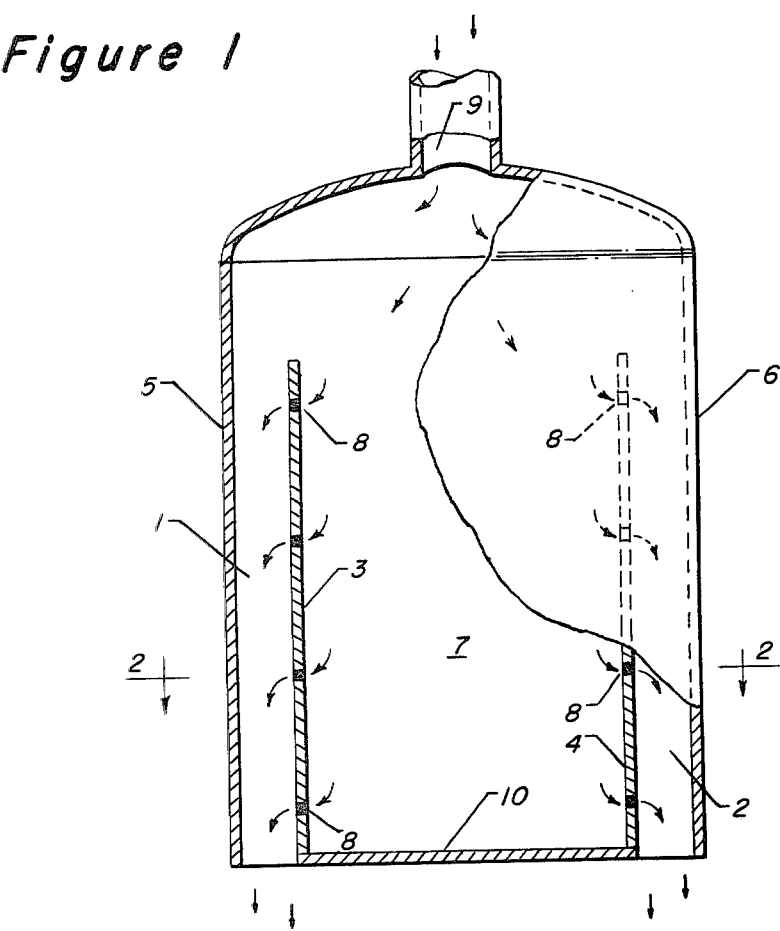

United States Patent [19]

Greenwood

[11] 4,308,238
[45] Dec. 29, 1981

[54] CATALYST FLOW DAMPENER

[75] Inventor: Arthur R. Greenwood, Niles, Ill.

[73] Assignee: UOP Inc., Des Plaines, Ill.

[21] Appl. No.: 132,970

[22] Filed: Mar. 24, 1980

[51] Int. Cl.³ .......................... B01J 4/00; B01J 8/14; B01J 23/90
[52] U.S. Cl. .................................. 422/310; 422/144; 422/219; 422/223
[58] Field of Search ............... 422/310, 223, 144, 216, 422/219, 178; 252/411 R, 418; 208/150-152, 165-176; 414/217-221

[56] References Cited

U.S. PATENT DOCUMENTS

| | | | |
|---|---|---|---|
| 2,451,924 | 10/1948 | Crowley | 422/223 |
| 3,652,231 | 3/1972 | Greenwood et al. | 422/223 |
| 3,838,039 | 9/1974 | Vesely et al. | 422/223 |
| 4,235,847 | 11/1980 | Scott | 422/195 |

*Primary Examiner*—Bradley Garris
*Attorney, Agent, or Firm*—James R. Hoatson, Jr.; Robert W. Welch; William H. Page, II

[57] ABSTRACT

A flow dampener apparatus is disclosed for converting a periodic discharge of a measured volume of catalyst particles to a substantially steady state flow.

3 Claims, 3 Drawing Figures

CATALYST FLOW DAMPENER

With regard to most hydrocarbon conversion processes effected in contact with a particulate catalyst, it is quite conventional to provide means for the periodic regeneration of the catalyst particles. However, in connection with the catalytic reforming of a naphtha or other suitable hydrocarbon feedstock, most of the process units have heretofore operated with a fixed catalyst bed over long periods of time without making provision for periodic regeneration or reconditioning of the catalyst. At such times as reconditioning appeared to be warranted, the reforming reactors were shut down and the entire catalyst inventory removed and replaced with new catalyst, or with catalyst which had been reconditioned at a remote facility. Alternatively, certain reforming operations have been designed to include a swing-reactor, i.e., an extra reactor, and in addition, a rather elaborate piping system so that one reactor at a time could be taken out of service to undergo in-situ regeneration of the catalyst contained therein. Neither the complete catalyst change nor the swing-reactor method of regeneration provide a really satisfactory system for maintaining a desired level of catalyst activity coupled with high conversions in multiple bed reforming reactors. As a result, it has been found to be of advantage to provide for a moving bed catalytic reforming system interacting with a moving bed regeneration system to achieve an optimum overall continuously operating reforming process. The moving bed regeneration system herein contemplated will typically comprise a moving bed of catalyst particles gravitating through a carbon burn-off/halogenation section, and finally through a drying section of a vertically elongated confined chamber. U.S. Pat. Nos. 3,470,090; 3,647,680; 3,785,963; 3,652,231 and 3,981,824 are further descriptive of the continuous catalytic reforming and regeneration process.

In practice, the progress of the catalyst particles gravitating through the regenerator column, i.e., the residence time, is determined by a periodic discharge of a measured volume of hot regenerated catalyst particles from the bottom of the column into a catalyst hopper. The periodic discharge is preferred to a continuous discharge in that it requires much simpler hardware and minimizes catalyst attrition. Regenerated catalyst then accumulates in the catalyst hopper for eventual recycle to the top of the reforming reactor to maintain a predetermined catalyst level therein. To facilitate the transfer of the hot particles from the regenerator column to the catalyst hopper, the hopper is typically vented to the column through a pressure equalizer line.

A heretofore undetected pressure surge has recently been observed in the regenerator column having the potential to cause excessive temperatures detrimental to the catalyst particles contained therein. It has now been determined that the pressure surge results from the described periodic discharge of hot regenerated catalyst particles, typically at about 800° F., into contact with the substantially cooler vapors, e.g., 200° F., which occur in the catalyst hopper. The effect is a momentary pressure increase in the catalyst hopper due to the thermal expansion of said vapors, and a resultant flow of said vapors through the pressure equalizer line into the regenerator column. Generally, the hot particles are discharged into the catalyst hopper for only about 15 seconds of a 60-second cycle. Thus, as soon as the flow of hot particles into the catalyst hopper has terminated, the pressure begins to subside due to heat loss and the resultant thermal contraction of said vapors, and there is a flow reversal in the pressure equalizer line. As this cycle repeats itself, air drawn through the pressure equalizer line during said flow reversal is re-injected into the burning section of the regenerator column, and the oxygen concentration therein becomes momentarily excessive as does the temperature.

It is therefore an object of this invention to provide a novel flow dampener apparatus for the recovery of hot regenerated catalyst particles from a moving bed regenerator column, said flow dampener having the effect of substantially obviating pressure surges in said regenerator column.

Thus, in one of its broad aspects, the present invention embodies a flow dampener apparatus for converting a periodic discharge of a measured volume of catalyst particles from a moving bed system to a substantially steady particle flow rate, which apparatus comprises a cylindrical vessel containing a pair of chordal-form catalyst passageways defined by the peripheral side-walls of said vessel and a pair of spaced apart chordal baffles disposed on opposite sides of a plane containing the central axis of said vessel and parallel thereto; a central catalyst hold-up chamber for receiving said periodic particle discharge and defined by said chordal baffles and the peripheral side-walls of said vessel which are not in common with said chordal-form catalyst passageways; the upper periphery of said chordal baffles being a finite vertical distance below the peripheral upper surface of said vessel; the lower peripheral surface of said vessel consisting of a horizontal plate attached to the lower periphery of said chordal baffles and extending between the lower periphery of said side-walls not common to said chordal-form catalyst passageways; said chordal baffles containing a plurality of horizontally opposed and vertically spaced apart outlet means, the horizontally opposed outlet means being sized to accommodate, in combination, up to about 50% of the average flow rate at which said catalyst particles are discharged into said catalyst hold-up chamber; and, said horizontally opposed outlet means being vertically spaced apart to provide a minimum particle hold-up volume between said outlet means substantially equivalent to the aforesaid measured volume of said catalyst particles.

Other objects and embodiments of this invention will become apparent in the following more detailed specification.

Figure 2:
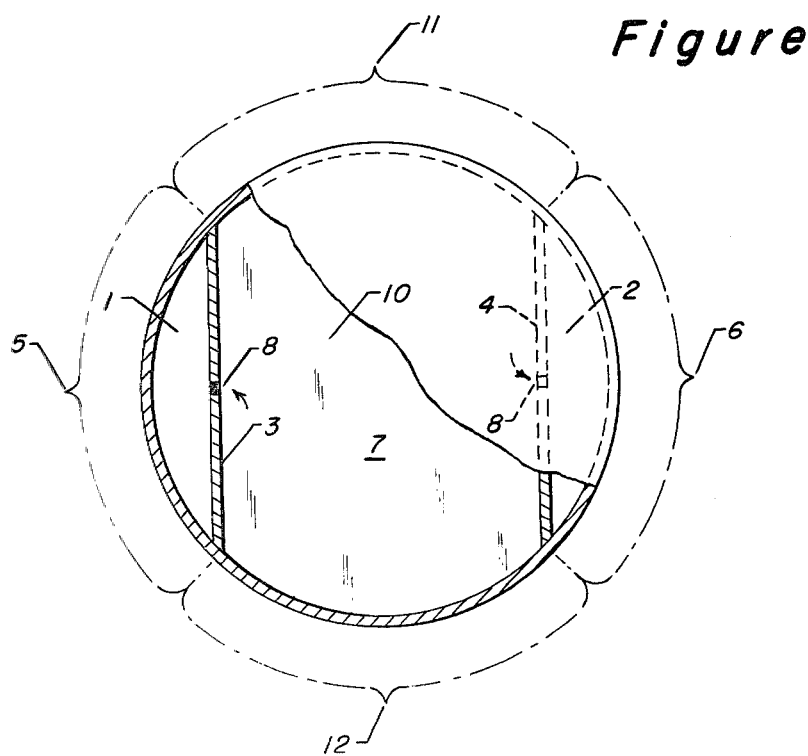

The further description of the flow dampener apparatus of this invention is presented with reference to the attached drawings. The drawings are not drawn to an accurate scale but are presented solely in illustration of the apparatus of this invention, and of its utility with respect to the conversion of a periodic discharge of hot regenerated catalyst particles from a moving bed regenerator column to a substantially steady state flow. With reference to the drawings, FIG. 1 represents a cross-sectional view of the flow dampener vessel, and FIG. 2 represents an overhead view taken approximately along line 2—2 of FIG. 1. Taken together, they show a pair of chordal-form catalyst passageways 1 and 2 which are defined by a pair of chordal baffles 3 and 4 and the peripheral side-walls 5 and 6 which are not common to the central catalyst hold-up chamber 7. Horizontally opposed outlet means or ports 8 through which the catalyst particles flow from the central catalyst hold-up chamber 7 into the catalyst passageways 1 and 2 are also shown. FIG. 1 further illustrates an inlet port 9 through which catalyst particles are periodically discharged into the central catalyst hold-up chamber 7. The lower peripheral surface of the flow dampener apparatus comprises a horizontal plate 10 attached to the lower periphery of said chordal baffles and extending between the lower periphery of the side-walls 11 and 12 which are not common to said catalyst passageways 1 and 2.

Another embodiment of this invention concerns a method for the recovery of hot regenerated catalyst particles from a moving bed regenerator column, which method comprises periodically discharging a measured volume of said hot catalyst particles from said regenerator column into a catalyst hold-up chamber of an enclosed flow dampener vessel situated inside a catalyst hopper of substantially larger volume, said flow dampener vessel comprising said catalyst hold-up chamber and a bottom-located outlet means to said catalyst hopper; said catalyst hold-up chamber being in open communication with said bottom-located outlet means through a plurality of vertically spaced-apart outlet means; the outlet means in any substantially horizontal plane being sized to accommodate up to about 50% of the average rate at which said hot particles are discharged into said catalyst hold-up chamber; said vertically spaced apart outlet means being vertically spaced apart to provide a minimum particle hold-up volume substantially equal to the aforesaid measured volume periodically discharged into said catalyst hold-up chamber; whereby a substantially continuous flow of hot catalyst particles is discharged from said catalyst hold-up chamber into said catalyst hopper. This embodiment is further described with reference to FIG. 3.

Figure 3:
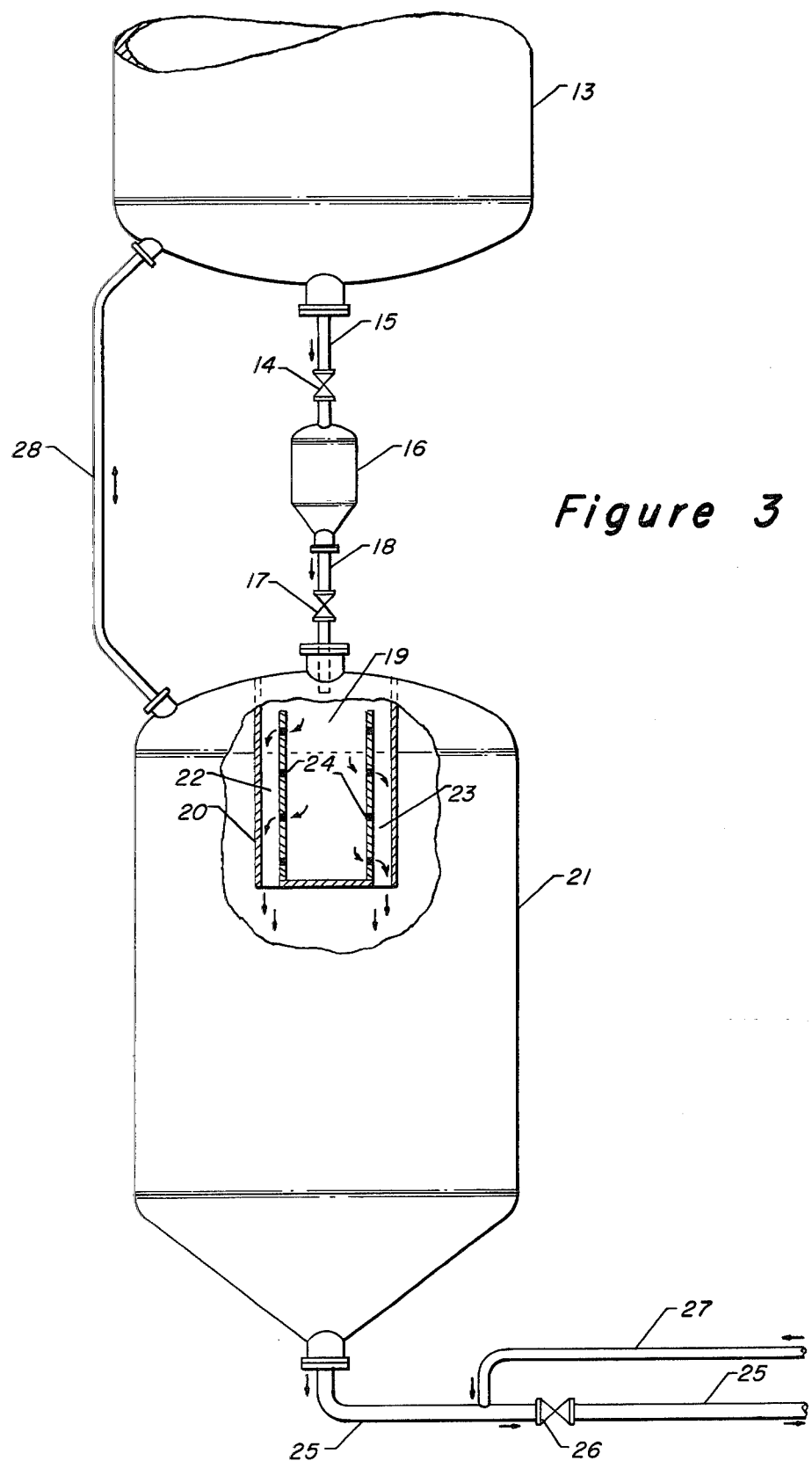

FIG. 3 depicts the flow dampener apparatus of FIGS. 1 and 2 situated in the catalyst hopper 21 which is of substantially larger volume. In the drawing, there is shown a portion of the lower or drying section of a moving bed regenerator column 13. Typically, the catalyst particles subjected to moving bed regeneration in the manner herein contemplated will be an alumina-supported platinum catalyst quite spherical in form with a particle diameter in the $1/32-\frac{1}{8}''$ range to provide free-flow characteristics not given to bridging or blocking of the descending moving bed system. The hot regenerated catalyst particles are withdrawn from the bottom of said regenerator column 13 through a control valve 14 in conduit 15. The particles are collected in an intermediate flow control hopper 16 having a capacity for about 952 cubic inches of said particles, and said hopper is filled to capacity. Control valve 14, and control valve 17 located in line 18, are programmed to alternate between the open and closed positions on a 60-second cycle, with control valve 17 remaining in the open position for about 15-30 seconds of said cycle to discharge the measured volume of catalyst particles into the central catalyst hold-up chamber 19 of the flow dampener 20 by way of line 18 while control valve 14 is in the closed position. The periodic discharge of the hot catalytic particles into the flow dampener 20 will not create any substantial pressure surge therein. This follows from the fact that the flow dampener vapors will achieve but not exceed the temperature of the hot particles contained therein; that the flow dampener itself affords little opportunity for any substantial heat loss—a condition which can of course be optimized with added insulation; and from the fact that the flow dampener has only a bottom-located outlet to the catalyst hopper whereby the hot vapors, by reason of their relatively low density, will be trapped in the dampener at a substantially steady-state temperature not conducive to pressure surges.

As heretofore stated, said flow dampener 20 is situated inside a catalyst hopper 21 of substantially larger volume. The hopper is an integral part of the moving bed system and functions as a reservoir from which catalyst particles are recycled to the reforming reactors which are not shown. The catalyst hopper is of a volume to receive the entire catalyst inventory of the moving bed regenerator during periods of shutdown to accomplish, for example, routine plant maintenance. During normal periods of operation, the catalyst level in the surge hopper is indicative of the catalyst attrition rate, and of the need for additional catalyst to the system. In any case, the flow dampener comprises the aforementioned catalyst hold-up chamber 19, catalyst passageways 22 and 23, and a plurality of horizontally opposed and vertically spaced apart catalyst outlet means 24. In the present illustration, four horizontally opposed pairs of outlet means are shown, the lowermost pair being sized to accommodate, in combination, a particle flow rate which is about 50% of the average rate at which the catalyst particles are discharged into the catalyst hold-up chamber 19. For example, since about 952 cubic inches of catalyst particles are discharged into the catalyst hold-up chamber per minute, the lowermost outlet means are sized to accommodate, in combination, about 476 cubic inches per minute. The vertical distance between the lower outlet pair and the outlet pair immediately above is such as to provide a minimum particle retention volume between said outlet pairs which is substantially equal to the flow control hopper volume. It will be appreciated that, under normal conditions of operation, only one additional opposed pair of outlet means is in use when the flow control hopper 16 is emptied into the flow dampener. Each of the three upper opposed pairs of outlet means is sized to accommodate, in combination, a particle flow which is about 25% of the average rate at which said particles are discharged into the central catalyst hold-up chamber, and the vertical distance between said upper opposed pair is substantially as described with respect to the two lower opposed pairs of outlet means. The flow control dampener will thus function properly at any flow rate between 50% and 125% of the designed particle discharge rate from said regenerator column. The described flow dampener will convert the periodic flow of catalyst particles from the flow control hopper into a continuous flow into the catalyst hopper with only about a 25% fluctuation in the flow rate. This is nevertheless quite sufficient to avoid any undue temperature fluctuation in the catalyst hopper and to substantially obviate any consequent pressure surge. The upper periphery of the chordal baffles is a finite vertical distance below the peripheral upper surface of the flow dampener to provide for particle overflow whenever plant maintenance requires dumping of the catalyst particles into the catalyst hopper at higher than design flow rate.

As heretofore mentioned, catalyst particles are recycled from the catalyst hopper to the reforming reactors, which are not shown. Said particles are withdrawn from the surge hopper through line 25 and a control valve 26. A nitrogen purge stream is provided to the catalyst hopper by way of line 27. Line 28 is a pressure equalizer line through which the catalyst hopper is vented to the regenerator column to facilitate a controlled transfer of particles from said column to said catalyst hopper.

From the foregoing, it is apparent that the present invention embodies a relatively simple flow dampener device effecting a substantially steady and continuous flow of hot catalyst particles into the catalyst hopper, and a substantially steady heat transfer from the particles to the catalyst hopper vapors. In this manner, pressure fluctuations originating in the catalyst hopper and reflected as excessive temperatures in the regenerator column are substantially obviated, as is the catalyst damage commonly associated therewith.

I claim as my invention:

1. A flow dampener for converting a periodic discharge of a measured volume of catalyst particles from a moving bed system to a substantially steady particle flow rate which comprises:

a cylindrical vessel containing a pair of chordal form catalyst passageways defined by the peripheral side-walls of said vessel and a pair of spaced apart chordal baffles disposed on opposite sides of a plane containing the central axis of said vessel and parallel thereto;

a central catalyst hold-up chamber for receiving said periodic particle discharge and defined by said chordal baffles and the peripheral side-walls of said vessel which are not in common with said chordal-form catalyst passageways;

the upper periphery of said chordal baffles being a finite vertical distance below the peripheral upper surface of said vessel;

the lower peripheral surface of said vessel consisting of a horizontal plate attached to the lower periphery of said chordal baffles and extending between the lower periphery of said side-walls not common to said chordal-form catalyst passageways;

said chordal baffles containing a plurality of horizontally opposed and vertically spaced apart outlet means, the horizontally opposed outlet means being sized to accommodate, in combination, up to about 50% of the average flow rate at which said catalyst particles are discharged into said catalyst hold-up chamber; and, said horizontally opposed outlet means being vertically spaced apart to provide a minimum particle hold-up volume between said outlet means substantially equivalent to the aforesaid measured volume of catalyst particles.

2. The flow dampener of claim 1 further characterized in that said chordal baffles contain four horizontally opposed pairs of vertically spaced apart outlet means.

3. The flow dampener of claim 1 further characterized in that said chordal baffles contain four horizontally opposed pairs of vertically spaced apart outlet means, the lowermost pair of horizontally opposed outlet means being sized to accommodate, in combination, about 50% of the average flow rate at which said catalyst particles are discharged into said catalyst hold-up chamber, and each of the remaining pairs of horizontally opposed outlet means being sized to accommodate a particle flow rate which is about 25% of the average rate at which said particles are discharged into said catalyst hold-up chamber.

* * * * *